(12) United States Patent
Gillot et al.

(10) Patent No.: US 6,315,672 B1
(45) Date of Patent: Nov. 13, 2001

(54) FREE FLIGHT INSTALLATION TO ARTIFICIAL PRODUCTION OF LEVITATING WIND

(75) Inventors: Dominique Gillot, Fontaines; Alain Godichon, Saint Rémy; Paul Ponsonnet, Lyons; Jean-Louis Soleilhac, Sucy en Brie, all of (FR)

(73) Assignee: ABB Solyvent-Ventec (FR)

(*) Notice: Subject to any disclaimer, the term of this patent is extended or adjusted under 35 U.S.C. 154(b) by 0 days.

(21) Appl. No.: 09/463,791

(22) PCT Filed: Jun. 11, 1998

(86) PCT No.: PCT/FR98/01217

§ 371 Date: Apr. 17, 2000

§ 102(e) Date: Apr. 17, 2000

(87) PCT Pub. No.: WO99/06274

PCT Pub. Date: Feb. 11, 1999

(30) Foreign Application Priority Data

Jul. 31, 1997 (FR) .................................................. 97 10044

(51) Int. Cl.⁷ .................................................. A63G 31/12
(52) U.S. Cl. ................................ 472/50; 472/68; 434/247
(58) Field of Search ............................. 472/49, 50, 134, 472/137, 68; 434/247; 73/147

(56) References Cited

U.S. PATENT DOCUMENTS

| | | | |
|---|---|---|---|
| 4,700,565 | * 10/1987 | Albuschkat | ............................. 73/147 |
| 5,593,352 | 1/1997 | Methfessel et al. | .. |
| 5,753,811 | * 5/1998 | Consolini | ................................ 73/147 |
| 6,083,110 | * 7/2000 | Kitchen et al. | ......................... 472/49 |

FOREIGN PATENT DOCUMENTS

| | | |
|---|---|---|
| 2 094 163 | 9/1982 | (GB) . |
| 2 228 772 | 1/1995 | (GB) . |
| 83 01380 | 4/1983 | (WO) . |
| 96 27866 | 9/1996 | (WO) . |

* cited by examiner

*Primary Examiner*—Kien T. Nguyen
(74) *Attorney, Agent, or Firm*—Lerner, David, Littenberg, Krumholz & Mentlik, LLP (57) ABSTRACT

Apparatus is disclosed for the production of a levitational wind comprising a flight chamber defining a levitation area, a blower unit including a plurality of blowers connected in parallel so as to provide their combined flow to the air inlet of the flight chamber, each of the blowers being disposed outside of the levitation area, with the blower unit having an axis essentially perpendicular to the vertical axis of the flight chamber, and an air coupler interposed between the air inlet of the flight chamber and the blower unit, the air coupler including a substantially 90° bend between the blower unit and the air inlet of the flight chamber, and wherein each of the plurality of blowers includes a delivery element for removable connection to the air coupler.

22 Claims, 5 Drawing Sheets

FREE FLIGHT INSTALLATION TO ARTIFICIAL PRODUCTION OF LEVITATING WIND

FIELD OF THE INVENTION

The present invention relates to installations for artificially producing a training and levitation wind for permitting people to float in the air, such as free flight simulators suitable for reproducing free fall in air.

BACKGROUND OF THE INVENTION

Installations for simulating free flight, whether they are intended for sports use, e.g. parachute training, or for artistic use, are known and serve to cause people or objects to be levitated by means of a substantially vertical jet of air produced over a limited area by means of a blower unit or system. The speed of the air is preferably more or less constant over the entire area of the jet of air, and the section of the jet can optionally be made variable while flight is in progress.

Thus, it is known, e.g. from British Patent Application No. 2,094,163, to make installations of this type in the form of a fixed installation having a closed air circuit. Such an installation makes use of a large building of fixed infrastructure having the simulation installation permanently installed therein. The installation has a free flight chamber in the form of a cylindrical chimney that is several meters tall and several meters across, together with a series of staircases, access rooms, and observation halls arranged around the chimney. The bottom portion of the chimney opens out into a room containing the blower unit which includes an impeller and the means required to drive it for the purpose of generating a vertical flow of air in the chimney. The installation also has a closed air circuit for sucking air in and blowing it out within the installation itself, so that in spite of its large size the installation operates in a closed circuit.

The size of such installations and the necessary equipment necessarily requires a high level of financial investment for implementation, and operating costs are also considerable, such that the building, use, and operation of such installations will continue to be limited and restricted in the future.

In an attempt to solve that problem, at least to some extent, proposals have already been made to reduce the size of the device and of the building, and to reduce the operating costs of an installation for simulating free flight by making installations that are smaller in size and that operate in the open air. Such installations reduce building and operating costs in a non-negligible manner since there is no longer any need to make a closed enclosure that is several tens of meters tall. Nevertheless, they still require an infrastructure and a stationary base building to be provided so that the initial financial investment is still high.

Thus, the general trend in the art of making free flight simulators has been to further reduce the size of such installations so as to make installations that can be dismantled at least in part, that are small in size, and that are designed to levitate a limited number of people, and in practice only a single person.

Such small-sized installations are described, for example, in PCT Application No. WO 83/01380 which describes a free flight simulator that can be dismantled, comprising a chimney acting as a flight chamber beneath which there are disposed three blowers connected to the chamber by means of a connection duct of progressively tapering section. The installation implements a chimney of a diameter that is smaller than two meters, and in order to limit head losses it makes use of a precise upwardly-directed angular orientation of the blowers. Such an installation is indeed of reduced size, but it is correspondingly limited to training and levitating a single parachutist because of the limited capacity of the blower unit matched to the size of the chimney. An installation of that type therefore cannot be used as a demonstration installation forming part of a large-scale attraction and remains confined to individual use for training purposes only.

PCT Application No. WO 96/27866 describes an installation for artificially producing a levitation wind. Such an installation is fixed and unsuitable for being dismantled, and it comprises a series of blowers disposed around the flight chamber. The installation is not in any way intended for use as a demonstration area since it is closed. On the contrary, it is fitted with a computerized video system for the purpose of creating a virtual world around the user within the chamber itself.

British Patent Application No. 2,288,772 discloses a free flight simulation installation of small capacity and size which is suitable for being moved and dismantled. That patent application describes a free flight simulator installed and mounted on a traveling chassis fitted with wheels and including an open circuit free flight chamber connected by means of a duct forming substantially a 90° bend to a single blower that is unsuitable for dismantling and that is disposed beneath the chamber outside the levitation area. The suction and blow axis of the blower is substantially horizontal and is consequently disposed perpendicularly to the vertical levitation flow.

Because of the small flow of air generated by the blower, that installation is likewise restricted to training an individual parachutist, and cannot be integrated in and used in large-scale shows or demonstrations requiring a plurality of parachutists to be present simultaneously in the levitation wind.

Consequently, an object of the present invention is to remedy the above-mentioned prior art installations by proposing a novel high-power installation for the artificial production of a training and levitation wind of air flow rate and capacity that are large enough to enable a plurality of parachutists to be levitated simultaneously, while nevertheless being of a size, particularly of a height, that is limited so as to enable it to be easily transported and installed in existing entertainment halls or venues.

Another object of the present invention is to provide a novel free flight installation that can be easily and completely dismantled, while still being capable of delivering air at a high flow rate and remaining small in size and adaptable to the volume and space available in various entertainment venues.

An additional object of the present invention is to propose a novel free flight simulation installation of large capacity and of high air flow rate which is suitable, during a show, for providing spectators with good viewing and sound comfort.

Another object of the present invention is to provide a novel flight simulation installation of high power in which control of the levitation flow is optimized.

SUMMARY OF THE INVENTION

In accordance with the present invention, these and other objects have now been realized by the discovery of apparatus for the production of a levitation wind comprising a flight chamber having a substantially vertical axis and defining a levitation area including a lower end defining an air inlet and a upper end defining an air outlet, a blower unit including a plurality of blowers connected in parallel so as to provide their combined flows to the air inlet of the flight chamber, each of the plurality of blowers being disposed outside of the levitation area, the blower unit having a delivery axis substantially perpendicular to the substantially vertical axis of the flight chamber, and an air coupling unit interposed between the air inlet of the flight chamber and the blower unit, the air coupling unit including a substantially 90° bend between the blower unit and the air inlet of the flight chamber, each of the plurality of blowers including a delivery outlet for removable connection to the air coupling unit. In a preferred embodiment, the blower unit has a predetermined height, and the flight chamber comprises a chimney having a predetermined diameter, the air inlet of the flight chamber being disposed at the level of a floor disposed a predetermined distance above the ground and surrounding the flight chamber whereby the air coupling unit can be at least partially disposed below the floor, the predetermined height of the floor being at least as great as the predetermined height of the blower unit and being in the range of 0.5 to 1.5 times the predetermined diameter of the chimney.

In accordance with one embodiment of the apparatus of the present invention, the predetermined height of the floor substantially corresponds to the predetermined diameter of the chimney.

In accordance with another embodiment of the apparatus of the present invention, the chimney has a non-circular configuration. Preferably, the chimney is substantially elliptical and has an oblong cross-section.

In accordance with another embodiment of the apparatus of the present invention, the plurality of blowers are mounted in a star-shaped configuration around the levitation area.

In accordance with another embodiment of the apparatus of the present invention, the plurality of blowers are mounted in a side-by-side configuration in a predetermined sector centered on the substantially vertical axis of the flight chamber. Preferably, the plurality of blowers includes a first plurality of blowers and a second plurality of blowers, the first and second plurality of blowers being mounted at two different heights.

In accordance with another embodiment of the apparatus of the present invention, the apparatus includes a plurality of noise reduction units associated with each of the plurality of blowers. Preferably, the plurality of noise reduction units are mounted upstream of the plurality of blowers. In another embodiment, the plurality of noise reduction units are mounted downstream of the plurality of blowers.

In accordance with another embodiment of the apparatus of the present invention, the air coupling unit comprises a common trunk, and each of the delivery outlets of the plurality of blowers are connected to the common trunk.

In accordance with another embodiment of the apparatus of the present invention, the apparatus includes a diffuser mounted at the upper end of the chimney, the diffuser including a progressively increasing diameter and having a diverging curvature.

In accordance with another embodiment of the apparatus of the present invention, the lower end of the chimney has a toroidal shape. In another embodiment, the lower end of the chimney has a conical shape. In yet another embodiment, the lower end of the chimney has a crescent shape.

In accordance with another embodiment of the apparatus of the present invention, the chimney comprises a plurality of superimposable segments comprising assemblable modules.

In accordance with another embodiment of the apparatus of the present invention, each of the plurality of blowers includes a suction segment, and the apparatus includes a plurality of filter modules disposed upstream of each of the plurality of suction segments. In a preferred embodiment, the apparatus includes a plurality of upwardly bent ducts attached to the plurality of filter modules, whereby the suction into each of the plurality of filter modules is offset upwardly relative to the ground.

In accordance with another embodiment of the apparatus of the present invention, the total flow rate of the plurality of blowers is between about 380 and 2500 $m^3/s$. Preferably, the levitation area is between about 7 and 20 $m^2$, whereby the flow rate is at least about 660 $m^3/s$ for a levitation area of 12 $m^2$.

In accordance with another embodiment of the apparatus of the present invention, a chimney is provided comprising a non-circular cross-section. Preferably, the chimney is substantially elliptical with an oblong cross-section.

The objects of the present invention are thus achieved by means of an installation for the artificial production of a training and levitation wind for making people float in the air, the installation comprising:

a free flight chamber defining a levitation area having an air inlet at its bottom and an air outlet at its top;

a blower unit disposed beneath the flight chamber and comprising at least one blower mounted outside the levitation area with the suction and delivery axis thereof extending substantially perpendicularly to the vertical levitation air flow; and an air coupling unit interposed between the blower and the air inlet and forming a substantially 90° bend beneath the flight chamber to connect the blower to the air inlet;

the installation being a high power installation, and the blower unit comprising a plurality of blowers connected in parallel and each forming a removable module whose delivery outlet is connected directly to the coupling unit.

The objects of the present invention are also achieved by means of a chimney for a free flight installation, in which the chimney is non-circular in section, preferably substantially elliptical in section, and presents a section that is oblong.

BRIEF DESCRIPTION OF THE DRAWINGS

Other details and advantages of the present invention are described in detail in the following detailed description, which, in turn, refers to the Figures, in which.

DETAILED DESCRIPTION

Figure 1:
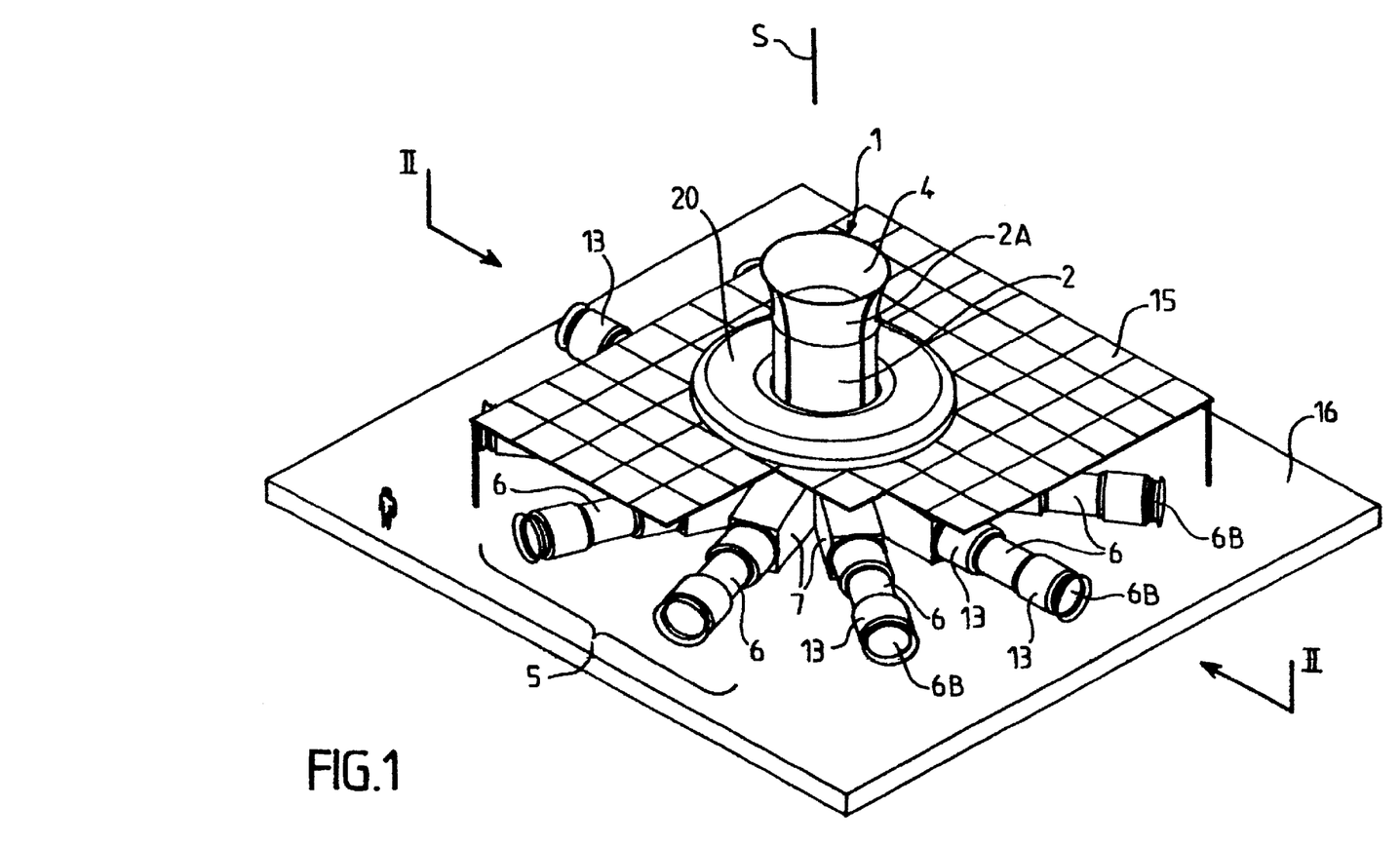
FIG. 1 is a top, perspective view of one embodiment of a free flight simulation installation of the present invention.
Figure 2:
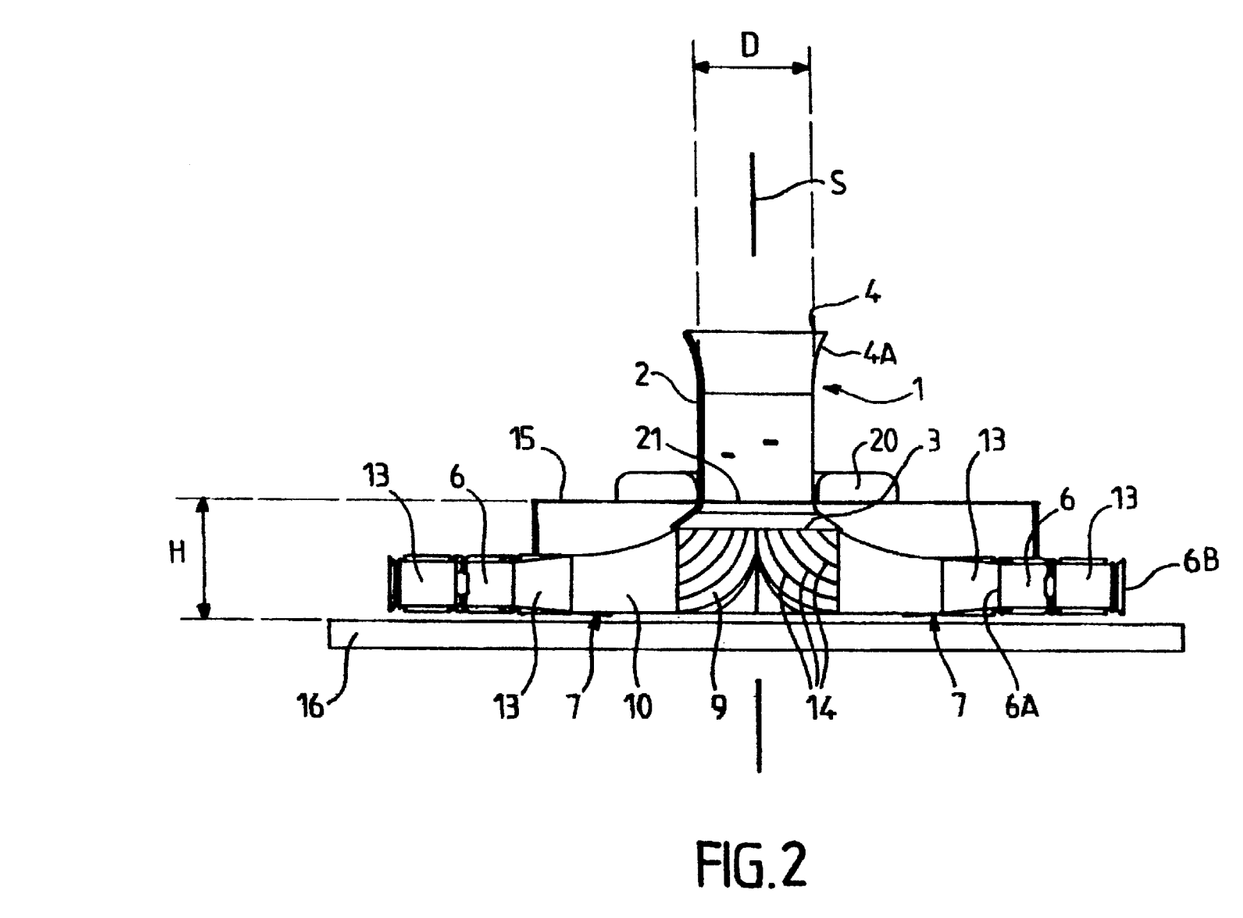
FIG. 2 is a side, elevational, cross-sectional view taken along line II—II of FIG. 1.

The installation of the present invention for artificially producing a driving and levitation wind, as is shown in FIGS. 1 and 2, comprises a free flight chamber 1 whose outside walls define a levitation area in which one or more people are to float. In the embodiments shown in FIGS. 1 to 4, the flight chamber 1 defines a levitation area having an air inlet 3 at its base and an air outlet 4 at its top. The flight chamber 1 has a chimney 2 that can be of various shapes, e.g. substantially cylindrical, standing on and defining the air inlet 3 and defining the air outlet 4 at its top.

The free flight simulation installation of the present invention also has a blower unit 5 disposed beneath the flight chamber 1 and comprising a plurality of blowers 6 connected in parallel and each forming a removable module.

In connection with the present invention, it should be understood that the term "connected in parallel" means that the blowers 6 are connected together in such a manner as to enable the individual air flows delivered by each of them to be combined so as to constitute a resulting flow which then corresponds to the sum of the individual flows so as to form the resulting vertical air flow of the installation that escapes through the air outlet 4.

The installation of the present invention also has an air coupling unit 7 interposed between each of the blowers 6 and the air inlet 3, each blower 6 being connected directly to the coupling unit 7.

In order to reduce the size and height of the installation as a whole, each blower 6 is mounted with its suction and delivery axis perpendicular to the vertical levitation air flow. The coupling unit 7 formed by a conventional metal duct or trunk of variable or constant section serves to connect the blowers 6 to the air inlet 3, while passing and extending beneath the flight chamber 1 over a first segment 10 that is substantially horizontal, followed by a 90° bend beneath and vertically under the chamber so as to terminate in a substantially vertical segment 9.

Such a disposition makes it possible to benefit from a high level of blower power without increasing the total height and size of the installation.

In the first embodiment of the present invention shown in FIGS. 1 and 2, the blowers 6 are mounted in parallel and they occupy a star disposition around the levitation area whose axis of symmetry is represented by the longitudinal axis of symmetry S of the chimney 2.

Advantageously, the blowers 6 are in the form of conventional axial type blowers having a mean outside diameter not exceeding about 2 meters, and they are disposed with their axes of rotation, and consequently their suction and delivery axes, horizontal, with all of these blowers preferably being disposed on a single level.

Advantageously, each blower 6 is associated with a noise-reducing device 13 or a silencer mounted downstream and/or upstream of the blower.

In a conventional manner that is well known in the art under consideration, noise-reducing devices constitute absorption beds formed by surrounding the blower in a layer of glass or rock wool lagging, the device being associated with a perforated metal cover. Other noise-reducing devices 13 can be envisaged as alternatives.

In the star embodiment shown in FIGS. 1 and 2, each blower 6 is connected by means of its delivery outlet 6A to the first segment 10, and the coupling unit as a whole can advantageously be formed by a series of removable segments with the terminal segment being suitable for connection to the terminal bend portion 9, which is itself connected to the base of the chimney 2. The terminal bend 9 can advantageously be implemented in the form of one or more coupling modules, advantageously fitted with air guides 14 (FIG. 2) that are themselves in the form of bends. The presence of these air guides 14 makes it possible to distribute air speed as uniformly as possible over the area of the coupling segment. As is shown in FIG. 2, the section of the coupling unit 7 increases towards the chimney 2. However, it would also be possible to envisage making its section essentially constant or even converging towards and up to the base of the chimney 2.

As is shown in particular in FIG. 2, this apparatus as a whole, including the blower unit 5 and the coupling unit 7, is situated beneath a floor 15 which is located above the ground 16 at a height H and which extends substantially parallel to the ground 16, level with or slightly higher than the base of the chimney 2.

Since the installation of the present invention is intended essentially to be transported and to be assembled and then dismantled in entertainment venues of volumes and total heights that are limited, it is particularly important to ensure that the height H does not exceed 3 to 4 meters. For greater values, the volume that remains free above the top end of the chimney 2 is too limited or insufficient, and the visibility for spectators is also reduced. Consequently, to keep the height of the floor 15 below a limit value close to 4 meters, while conserving a levitation area that is sufficiently large, e.g. of the order of 7 $m^2$ to 20 $m^2$, and on average of the order of 12 $m^2$, so that several people can float simultaneously in the air, the diameter of the blowers 6 must be kept down, while nevertheless making it possible to provide a flow rate that is sufficient for levitation purposes, and is of the order of at least about 380 $m^3/s$ to 400 $m^3/s$. To ensure that these optimum and necessary conditions are united in the installation, it is important for the floor 15 surrounding the chimney 2 and covering at least a portion of the coupling unit 7, and possibly also covering the blower unit 6, to be at a height H which is greater than or equal to the height of a blower unit 6 and which lies in the range of from 0.5×D to 1.5×D, and that is preferably close to D, where D is equal to the diameter of the chimney 2.

In practice, the sectional area of the air jet corresponding substantially to the levitation area defined by the walls of the chimney 2 must not be less than an equivalent diameter of 3 meters, so as to enable one or more parachutists to perform freely. It can naturally be significantly greater, and the diameter D can be of the order of 4 to 5 meters. With large diameters, the limitation lies essentially in making the installation and in providing the power required by the blower system. In embodiments the size of an installation in accordance with the present invention, using a single high-power blower and transporting such a blower would be incompatible with the desired object, i.e. that of being able to transport and install a large-capacity free flight installation in a non-permanent manner.

To complete the installation of the present invention, the chimney is advantageously surrounded by an annular structure 20 resting on the floor 15 and formed by a membrane or by a flexible or inflatable cushion so as to provide safety for a parachutist in the event of falling outside the air jet. In a likewise manner, parachutists' safety is also provided by mounting a safety net 21 which is disposed inside the chimney 2 over the air inlet 3. The presence of the net 21 makes it possible to dampen any unexpected fall of a parachutist inside the chimney 2.

To obtain better control over the levitation air jet, it is possible to provide for the chimney 2 to be fitted with a diffuser 4A in the terminal portion of the chimney so as to reduce the speed at which air is ejected into the free field and consequently reduce the associated energy loss. Advantageously, the diffuser 4 is shaped in such a manner that its outside diameter increases progressively, following a diverging curve.

The convergence of the flow of air inside the chimney 2 can also be improved by making the outer envelope of the air inlet 3 in a toroidal or conical shape, or indeed with a profile in the form of crescents of generally cylindrical shape, the air inlet 3 optionally being directly integrated with the coupling unit 3, and specifically with the bend 9.

To ensure that the installation as a whole remains modular and suitable for dismantling, the chimney 2 can also be made up as a plurality of portions so that it is easier to transport. To this end, the chimney 2 can be made up of elements that are assembled together along generator lines of the chimney, or in the form of segments 2A perpendicular to the axis of the air jet.

Under such circumstances, the chimney is made up of modules that can be assembled together and that are implemented in the form of superposable segments 2A.

Figure 3:
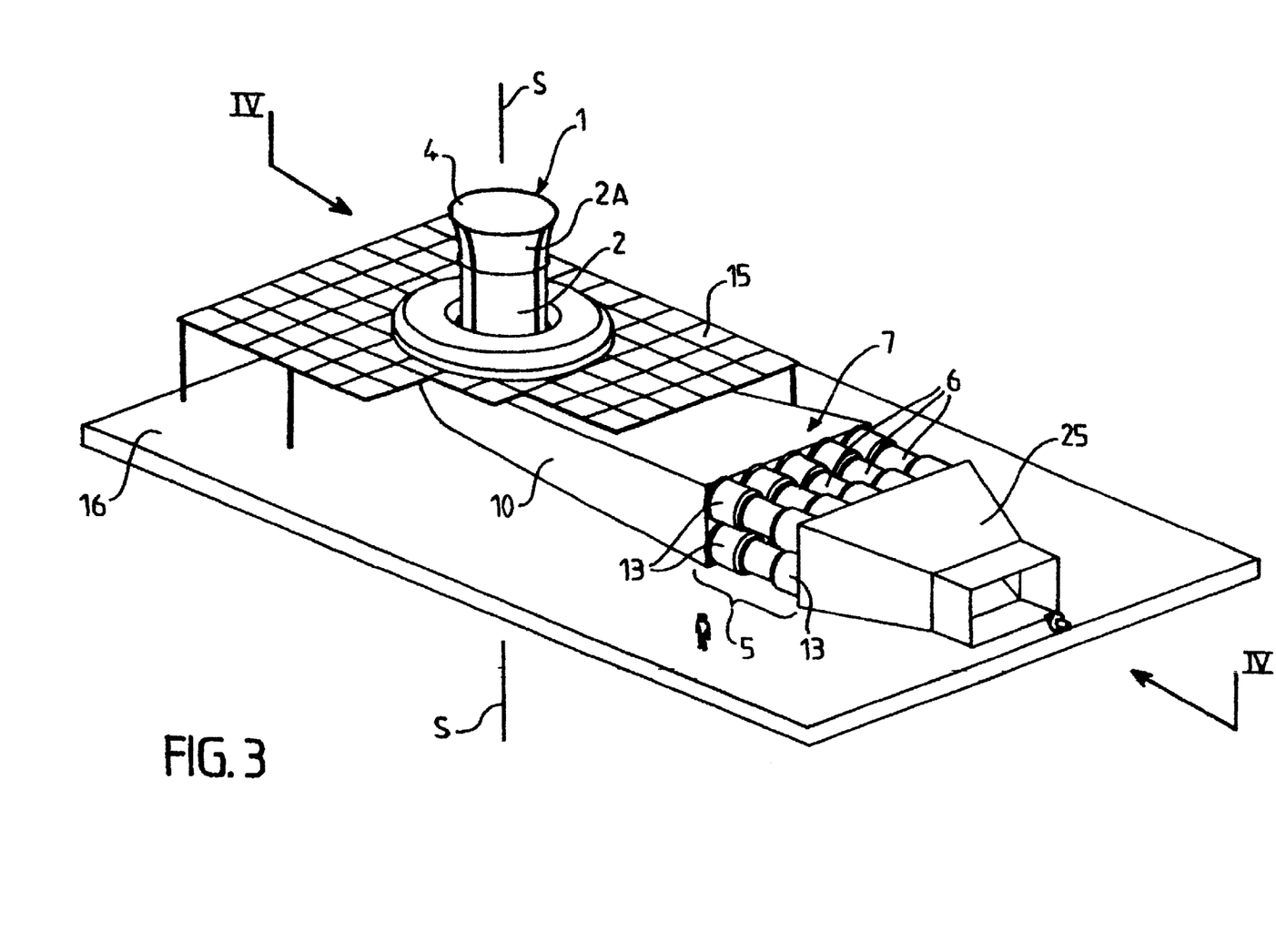
FIG. 3 is a top, perspective view of another embodiment of a free flight simulation installation of the present invention.
Figure 4:
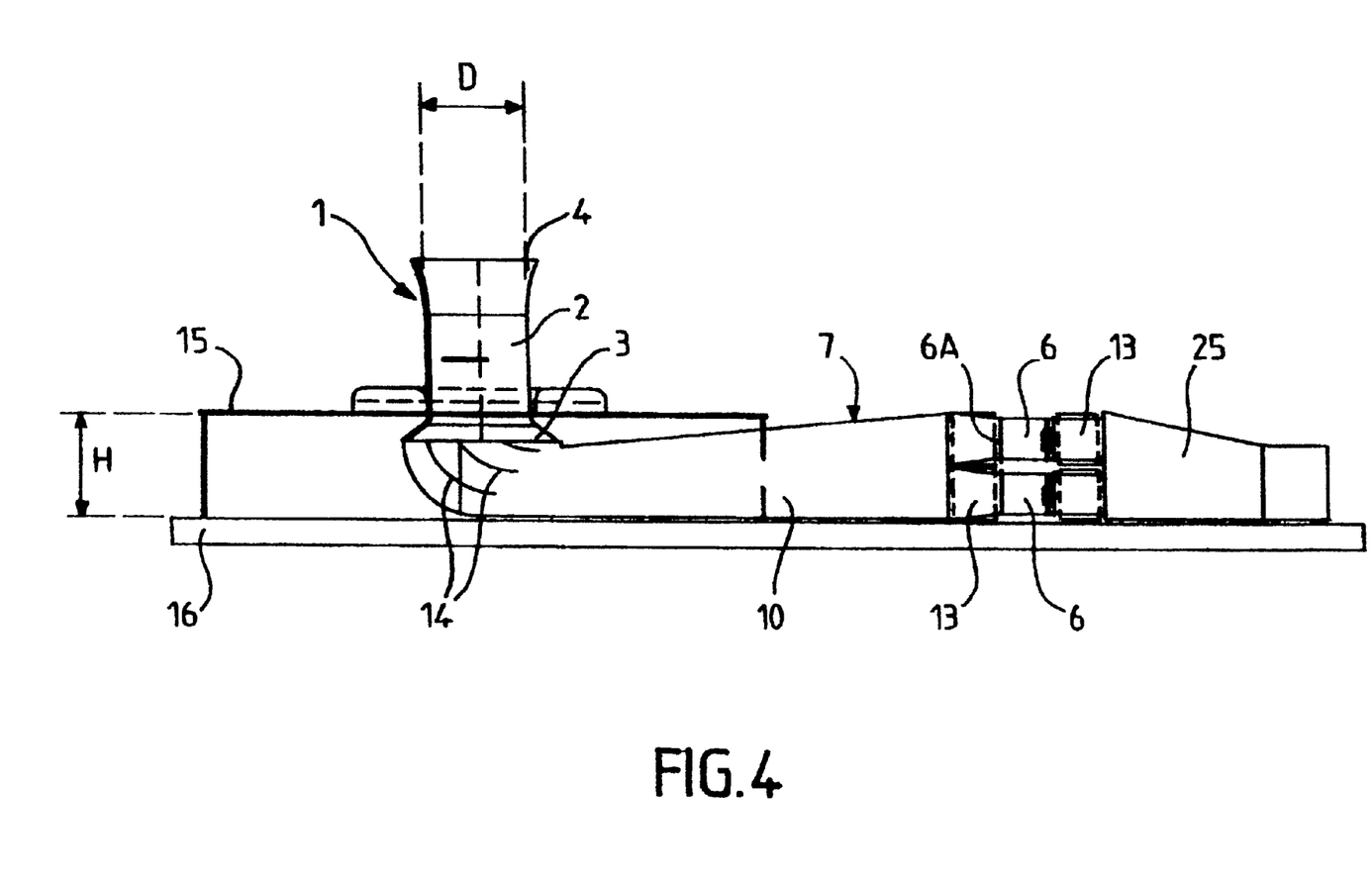
FIG. 4 is a side, elevational, cross-sectional view taken along line IV—IV of FIG. 3.

The embodiment shown in FIGS. 3 and 4 differs from that shown in FIGS. 1 and 2 only in the specific disposition of the blowers 6 constituting the blower unit 5.

To ensure that the installation remains suitable for being dismantled, modular, and adaptable to various geometrical situations imposed by the volume available and the configuration of entertainment venues, it is necessary to design an installation which can be installed in a plurality of configurations. The blower unit 5 shown in FIGS. 3 and 4 comprises a plurality of blowers 6 mounted side by side over a defined sector that is of limited extent and centered about the axis S of the chimney 2. In the example shown in FIG. 3, the blowers 6 are mounted so as to be superposed in two levels within the sector, they are mounted parallel to one another, and above one another, and by way of example there may be ten of them.

Advantageously, the suction segments 6B of the blowers 6 are connected to a common inlet trunk 25. The blowers 6 are also provided with noise-reducing devices 13. In this embodiment, the first coupling segment 10 forms a trunk that is common to all of the blowers 6, e.g. converging towards the inlet 3 of the chimney 2. In a variant, the section of the coupling trunk 8 can be constant.

By grouping together the plurality of blowers 6 over a side sector of the chimney 2, it is possible to adapt the installation to the particular configurations of certain entertainment venues.

The blowers 6 can be driven either by fixed speed or variable speed electric motors, or by hydraulic motors.

The power necessary for operating such an installation can be as great as or greater than about 1000 kW. Power can then be delivered by one or more generator units, e.g. using diesel engines, and likewise suitable for being transported to the site.

Advantageously, and given the total modularity of the blower system, the use of a hydraulic motor associated individually with each blower can be preferable. Under such circumstances, each hydraulic motor is powered by an individual hydraulic pump which can advantageously be situated outside the installation and driven by an individual electric motor or diesel engine. Given the number of blowers 6, it is also advantageous to ensure that the speeds of the various blowers 6 are synchronized.

Under all circumstances, installation of the present invention must be capable of delivering an air jet having a mean speed of from about 45 m/s to 60 m/s, with the preferred speed lying in the range of from about 50 m/s to 55 m/s. The air flow characteristics of a large capacity installation of the present invention are not less than about 380 $m^3$/s, and for example preferably about 660 $m^3$/s for a levitation area of about 12 $m^2$, with the installation of the present invention being capable of providing greater air flow rates up to about 1500 $m^3$/s or even about 2500 $m^3$/s, while still continuing to be an installation that can be dismantled and that requires little height. Within the meaning of the present invention, a high power installation thus has minimum characteristics concerning the flow rate and the size of the levitation area as defined above, which characteristics can lie in the range of from about 380 $m^3$/s to 2500 $m^3$/s for a levitation area lying in the range of from about 7 $m^2$ to 20 $m^2$.

Figure 5:
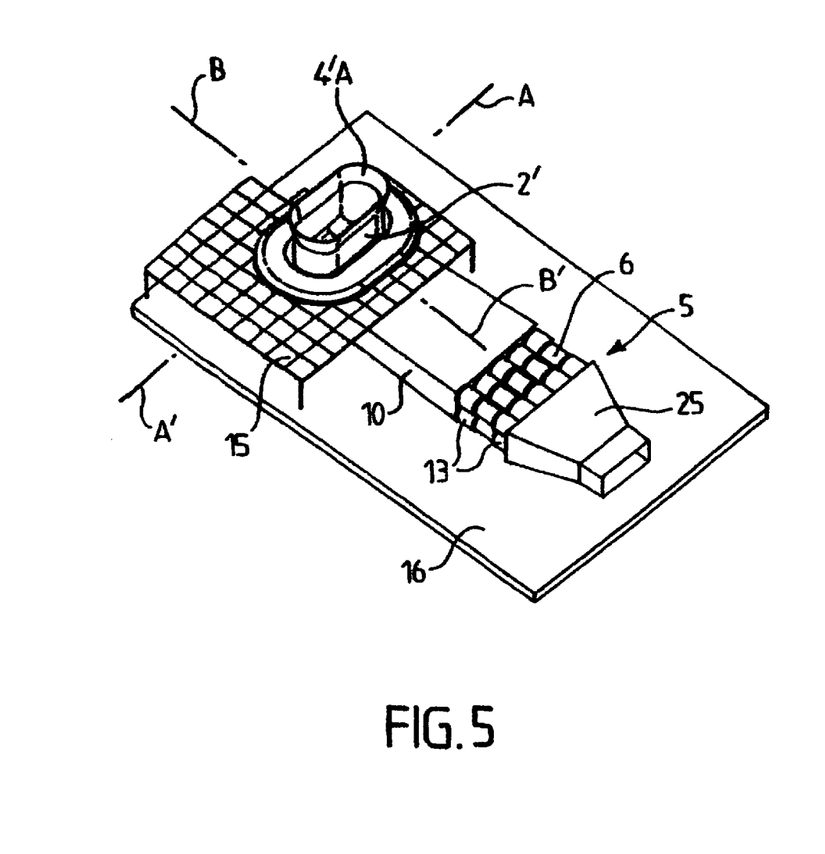
FIG. 5 is a top, perspective view of another embodiment of the present invention with a specific configuration for the flight chamber.

FIG. 5 shows an embodiment of the present invention which differs from the preceding embodiments only in the special configuration of the chimney 2'. The chimney need not be circular in section, and for example its section can be substantially elliptical so as to present a cross-section that is oblong. Advantageously, and as shown in FIG. 5, the chimney 2' is built as two semicircles whose centers are spaced far enough apart so that the associated circles, if plotted in full, would not touch and would not intersect. Such a configuration has the advantage of making it easier for two or more parachutists to move in or above the chimney 2' because the oblong shape of the section defines a longitudinal major axis of symmetry AA' that is longer than the minor axis BB'. This embodiment has no particular effect on how the installation is designed, since the dimensional relationships between the height of the floor H and thus the dimensions of the blower unit 5, and the "equivalent" diameter of the chimney 2' remain unchanged. The levitation area of the chimney 2' lies in the range of from about 7 $m^2$ to 20 $m^2$, while its "equivalent" diameter D, as commonly accepted in the air-flow industry, is the diameter D of a circle having the same area as the non-circular section of the chimney 2'.

Naturally, the use of a non-circular chimney of generally oblong shape, as shown in FIG. 5, is not limited to a high power and low height modular installation of the kind described in this patent application. Such a chimney configuration can be used independently of an installation of the present invention and can be mounted on any conventional free flight installation.

Figure 6:
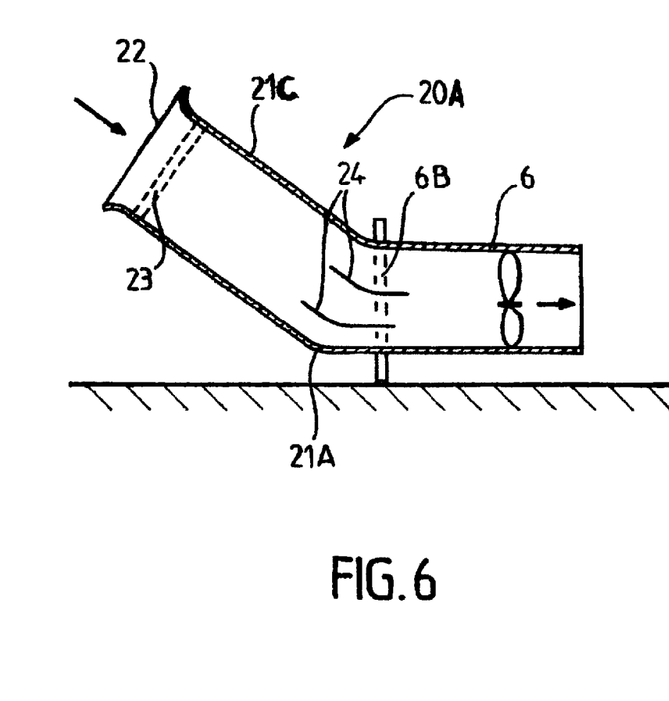
FIG. 6 is a side, elevational, partially sectional, fragmentary view showing a structural detail of the suction segment of the blowers used in the present invention.

As a variant, FIG. 6 shows a particularly advantageous embodiment for admitting air to the blowers 6. To avoid sucking in dust, dirt, and objects that might be lying on the ground 16, and to ensure greater safety for the parachutists, it is advantageous to provide a filter module 20A on the installation upstream from the suction segment 6B of each blower 6 or of the common inlet thereto. The filter module 20A, e.g. having a mesh, advantageously includes one or more bend ducts 21C coupled to the upstream end of the blower unit 5, or of the suction segment 6B of each blower 6, respectively. The bend duct(s) 21C change(s) direction upwards relative to substantially horizontal ground 16, going away from the ground 16 so that suction takes place through the admission orifice 52 of the duct 21C that is at a height above the ground 16. The filter member 23 is incorporated in and fixed to the duct 21C. The duct 21C can be provided on its inside, in its bend portion 21A, with fixed blades 24 for directing the flow of air.

In operation, the installation enables a plurality of parachutists to move side by side in the chimney 2, 2' which can optionally be made out of a transparent synthetic material so as to enable them to be observed. Access to the chimney and to the vertical levitation air jet can be achieved via a series of ladders that are not shown in the figures.

The present invention primarily lies in manufacturing installations for the artificial production of a levitation wind for the purposes of training people who perform free flight.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the production of a levitation wind comprising a flight chamber comprising a chimney having a predetermined diameter, said flight chamber having a substantially vertical axis and defining a levitation area including a lower end defining an air inlet and an upper end defining an air outlet, a blower unit including a plurality of blowers connected in parallel so as to provide their combined flows to said air inlet of said flight chamber, each of said plurality of blowers being disposed outside of said levitation area, said blower unit having a predetermined height and a delivery axis substantially perpendicular to said substantially vertical axis of said flight chamber, and an air coupling unit interposed between said air inlet of said flight chamber and said blower unit, said air coupling unit including a substantially 90° bend between said blower unit and said air inlet of said flight chamber, said air inlet of said flight chamber being disposed at the level of a floor disposed a predetermined distance above the ground and surrounding said flight chamber whereby said air coupling unit can be at least partially disposed below said floor, said predetermined height of said floor being at least as great as said predetermined height of said blower unit and being in the range of 0.5 to 1.5 times said predetermined diameter of said chimney, each of said plurality of blowers including a delivery outlet for connection to said air coupling unit.

2. The apparatus of claim 1 wherein said predetermined height of said floor substantially corresponds to said predetermined diameter of said chimney.

3. The apparatus of claim 1 wherein said chimney has a non-circular configuration.

4. The apparatus of claim 3 wherein said chimney is substantially elliptical and has an oblong cross-section.

5. The apparatus of claim 1 wherein said plurality of blowers are mounted in a star-shaped configuration around said levitation area.

6. The apparatus of claim 1 wherein said plurality of blowers are mounted in a side-by-side configuration in a predetermined sector centered on said substantially vertical axis of said flight chamber.

7. The apparatus of claim 6 wherein said plurality of blowers includes a first plurality of blowers and a second plurality of blowers, said first and second plurality of blowers being mounted at two different heights.

8. The apparatus of claim 6 wherein said air coupling unit comprises a common trunk, and wherein each of said delivery outlets of said plurality of blowers are connected to said common trunk.

9. The apparatus of claim 1 including a plurality of noise reduction units associated with each of said plurality of blowers.

10. The apparatus of claim 9 wherein said plurality of noise reduction units are mounted upstream of said plurality of blowers.

11. The apparatus of claim 9 wherein said plurality of noise reduction units are mounted downstream of said plurality of blowers.

12. The apparatus of claim 1 including a diffuser mounted at said upper end of said chimney, said diffuser including a progressively increasing diameter and having a diverging curvature.

13. The apparatus of claim 1 wherein said lower end of said chimney has a toroidal shape.

14. The apparatus of claim 1 wherein said lower end of said chimney has a conical shape.

15. The apparatus of claim 1 wherein said lower end of said chimney has a crescent shape.

16. The apparatus of claim 1 wherein said chimney comprises a plurality of superimposable segments comprising assemblable modules.

17. The apparatus of claim 1 wherein each of said plurality of blowers includes a suction segment, and including a plurality of filter modules disposed upstream of each of said plurality of suction segments.

18. The apparatus of claim 17 including a plurality of upwardly bent ducts attached to said plurality of filter modules, whereby the suction into each of said plurality of filter modules is offset upwardly relative to said ground.

19. The apparatus of claim 1 wherein the total flow rate of said plurality of blowers is between about 380 and 2500 $m^3/s$.

20. The apparatus of claim 19 wherein said levitation area is between about 7 and 20 $m^2$, whereby said flow rate is at least about 660 $m^3/s$ for a levitation area of 12 $m^2$.

21. A chimney for the apparatus of claim 1 said chimney comprising a non-circular cross-section.

22. The chimney of claim 21 being substantially elliptical with an oblong cross-section.

* * * * *